Aug. 30, 1966

C. C. YOUNG 3,269,159

THEFT PREVENTION DEVICE FOR TRAILERS

Filed Aug. 17, 1964

INVENTOR.
Chalmers C. Young
BY
Frederick J. Kubel
Atty.

Aug. 30, 1966  C. C. YOUNG  3,269,159
THEFT PREVENTION DEVICE FOR TRAILERS
Filed Aug. 17, 1964  2 Sheets-Sheet 2

INVENTOR.
Chalmers C. Young
BY
Frederick J. Koubek
Atty.

United States Patent Office 3,269,159
Patented August 30, 1966

3,269,159
THEFT PREVENTION DEVICE FOR TRAILERS
Chalmers C. Young, 628 S. 9th Ave., La Grange, Ill.
Filed Aug. 17, 1964, Ser. No. 389,878
11 Claims. (Cl. 70—232)

This invention relates to theft prevention devices for conventional trailers of the type hauled by motor truck tractors and more particularly, to a new and improved lock collar for application to the tractor kingpin or hitch pin to prevent unauthorized engagement of the kingpin by the fifth wheel of a motor truck tractor.

The conventional tractor-trailer hitch or coupling structure utilized to couple a motor truck tractor to a trailer has been standardized so that any tractor regardless of make can be coupled to any trailer throughout the trucking industry and, in its broadest aspect, includes a so-called fifth wheel provided with a skid plate having an opening through carried by the motor truck tractor chassis frame. The conventional coupling structure also includes a kingpin depending from the frame of the trailer which is adapted to extend downwardly into the skid plate opening and have an annular groove or circumferential recess, which is provided thereon, engaged by movable jaws of the fifth wheel. The jaws on the fifth wheel engage the annular groove on the kingpin of the trailer to pivotally secure the trailer to the motor truck tractor. When the kingpin is locked into engagement with the fifth wheel, the trailer can then be hauled about by the tractor.

The trailer-motor truck tractor combination is popularly used for the transportation of freight or for other purposes. When the destination is reached, the trailer is usually uncoupled from the tractor to await unloading of the freight or cargo. Furthermore, the trailers are generally loaded when in an uncoupled condition. Thus, there are many occasions when the trailers are not coupled to tractors and when in this uncoupled condition are frequently parked or stored at isolated spots, or a great number of trailers may be temporarily stored in any of a number of unguarded places. Consequently, because the tractor-trailer coupling structure has been universally adapted and because of the fact that trailers are, of necessity, oftentimes left unattended in uncoupled condition, the theft of trailers and their cargoes has been on the uprise. It is relatively simple for thieves to merely couple their own tractor to any unguarded trailer and haul the trailer and its cargo away. There has been a recent sudden rise in the number of trailers hijacked and the annual loss sustained by shippers and insurance companies due to the hijacking of trailers and their cargoes is a very substantial one. It is, therefore, an important object of the present invention to mitigate the theft loss possibilities confronting the operators, insurers, and users of trailers for transporting freight and other commodities by providing a lock collar for the uncoupled trailer kingpin which affords an effective safeguard against coupling the trailer kingpin to a tractor by an unauthorized person.

Various means of locking a trailer to prevent theft thereof have been proposed heretofore and such means has sometimes taken the form of a collar capable of being locked onto the kingpin to prevent engagement with the fifth wheel of a tractor. However, prior lock collar constructions have been objectionable for one or more of a multitude of reasons. Certain lock collar designs were not strong enough to resist heavy blows without being broken and rendered useless; other designs required many costly parts, some of which were separable when the collar was in its unlocked condition and, hence, capable of being easily misplaced or lost; still other collar designs were difficult to install and remove by the user. Thus, it is another important object of the present invention to obviate the above enumerated and other shortcomings of prior lock collars by providing a split lock collar design which clamps around a fifth wheel kingpin of a trailer and locks in position to prevent the engagement of the kingpin with the fifth wheel on a motor truck tractor and which lock collar design involves a minimum number of components and, hence, is relatively inexpensive to manufacture and maintain in good working order, more rugged and sturdy in construction, tamper proof, and extremely easy to apply to and remove from the trailer kingpin.

Still another object is to provide a rugged lock collar for trailer kingpins which embodies a simple key-operated lock for securing it in position on a kingpin and which is so constructed that it will not be easily broken, or pried or burned off the kingpin.

The foregoing and other important objects and desirable features inherent in and encompassed by the invention, together with the many purposes and uses thereof, will become readily apparent from a reading of the ensuing description in conjunction with the annexed drawings, in which, FIGURE 1 is a perspective view of a trailer kingpin lock collar embodying the invention; the lock collar is illustrated in its closed condition, detached from the trailer kingpin;

Figure 1:
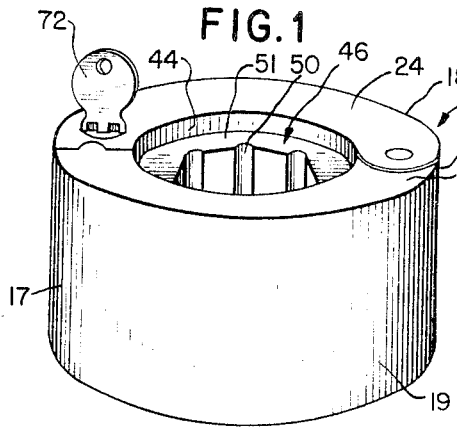
Figure 3:
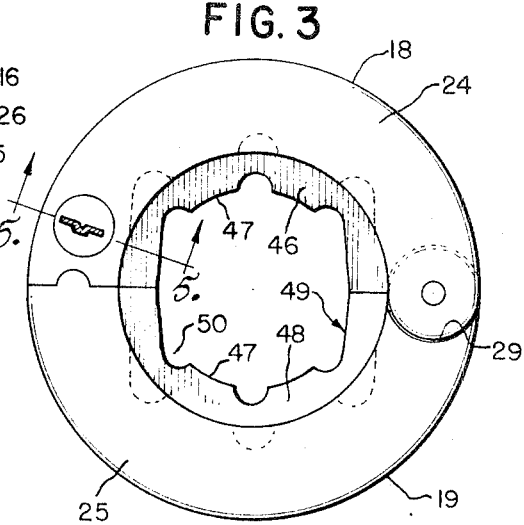
FIGURE 3 is a bottom plan view of the lock collar illustrated in FIGURE 2.

Referring to the drawing in detail, wherein like reference characters represent like elements throughout the various views, the trailer coupler pin or kingpin, designated generally by reference character 10, has one end provided with a radially extending integrally formed flange 11 which is secured to a fifth wheel plate 12 by suitable means, such as rivets. The plate 12, in turn, is riveted or otherwise secured to the bottom of the trailer frame (not shown). The trailer kingpin 10 includes a cylindrical section 13 which depends from the flange 11. Integrally formed with and extending vertically from the lower end of the cylindrical section 13 is a reduced diameter section 14. The trailer kingpin 10 is also formed with an annular flange 15 which defines the lowermost end of the kingpin 10. The diameter of the flange 15 is the same as the diameter of the cylindrical section 13. The above described trailer coupling structure is conventional in every respect, and in the operation of the trailer, the fifth wheel (not shown) of the tractor is backed under the plate 12 raising it to enable the trailer kingpin 10 to enter an open end of an elongated slot formed in the tractor fifth wheel plate. When the kingpin 10 is bottomed in the elongated slot, a latch is operated and a hook engages the reduced diameter section 14 to lock the kingpin 10 in place. In this manner, the tractor is pivotally connected with the trailer for hauling the same. The dimensions of the trailer kingpin 10 have become more or less standardized in order to permit the trailer to be drawn by a variety of tractors and it will be readily understood that under such conditions an unguarded trailer could easily be coupled to a tractor and hauled away by thieves.

The anti-theft device, designated generally by reference character 16, of the present invention which is usable in conjunction with a trailer kingpin 10 to, in effect, bridge the reduced diameter section 14 and preclude engagement of the tractor fifth wheel with the kingpin 10 and to thereby prevent coupling of a tractor and trailer by unauthorized persons includes a lock collar 17. The lock collar 17 is constructed of two generally semi-annular members 18 and 19 which are hingedly secured together adjacent one end by means which will be described presently. The semi-annular members 18 and 19 are preferably made of an aluminum alloy so as to be relatively light in weight without sacrificing the necessary toughness and durability required in anti-theft devices of the type to which the present invention relates.

Figure 2:
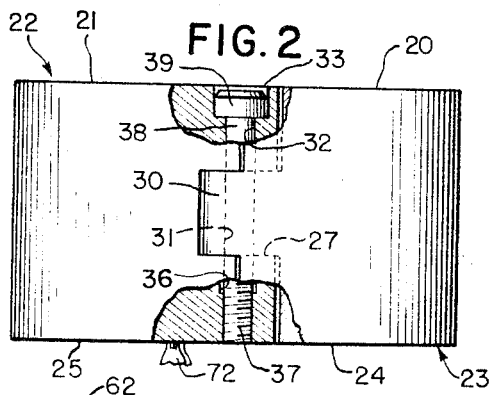
FIGURE 2 is a side elevational view of the lock collar in its closed condition; a portion of the lock collar is broken away to better illustrate the invention.

As best shown in FIGURE 2, semi-annular members 18 and 19 have substantially flat arcuate faces 20 and 21, respectively, which normally constitute the uppermost surface 22 of the device 16 when this device 16 is applied to the kingpin 10 as contemplated. The normally lowermost surface 23 of the device 16 is spaced and generally parallel to the uppermost surface 22 and is defined by substantially flat, arcuate faces 24 and 25 of semi-annular members 18 and 19, respectively. The end of the semi-annular member 18 which is hingedly connected to the semi-annular member 19 has a rounded or curved surface as indicated by reference character 26, and is provided with a slot 27 spaced substantially midway between the uppermost and lowermost faces 20 and 24, respectively. The bottom of the slot 27 is defined by a concave surface 28 having substantially the same radius of curvature as the rounded end surface 26. The corresponding hinge end of the semi-annular member 19 has its surface 29 formed with a depression for receiving the end of the semi-annular member 18 when the semi-annular members 18 and 19 are pivotally connected together. A slight clearance is provided between the end surfaces 26 and 29 to avoid any binding between the semi-annular members 18, 19 at the hinge connection. Integrally formed with and projecting from the concave surface 29, substantially midway between the uppermost and lowermost faces 21, 25 of the semi-annular member 19 is a tongue 30 which is adapted to extend into the slot 27. The terminal end of the tongue 30 is curved and conforms with the bottom surface 28 of the slot 27. The tongue 30 is provided with an elongated bearing 31 therethrough. A bore 32 extending from the slot 27 and opening into one end of a counterbore 33 is formed in the hinge connection end of the semi-annular member 18. The counterbore 33 opens into the normally uppermost face 20 of the member 18 and the juncture of the bore 32 and counterbore 33 is defined by an annular shoulder 34. The bore 32 and counterbore 33 are in axial alignment when the semi-annular members 18, 19 are hingedly connected together. The semi-annular member 18 is also provided with a threaded recess 35 which extends from the normally lowermost face 24 thereof and is in axial alignment with the bore 32. The threaded recess 35 opens into a slightly larger bore 36 which, in turn, opens into the slot 27. A threaded end section 37 provided on one end of an elongated pivot or hinge pin 38 is insertable through the counterbore 33, bore 32, bearing 31, bore 36 and is adapted to be screwed into the threaded recess 35. The end of the hinge pin 38 opposite the threaded end section 37 is in the form of an enlarged head 39 which is adapted to be disposed completely below the uppermost face 20 of the semi-annular 18 and in abutting engagement with the shoulder 34 when drawn up tightly. The head 39 is provided with an Allen wrench type socket for rotating the same. From the foregoing, it will be appreciated that the semi-annular members 18 and 19 are ruggedly connected together for relative pivotal movement and the hinge pin 38 can only be removed from operative engagement with the semi-annular members 18 and 19 by being withdrawn from the uppermost face 20 of the member 18. The importance of this latter face will be appreciated hereinafter.

The ends of the semi-annular members 18, 19 opposite the hingedly connected ends abut along surfaces 40 and 41 which are generally flat when the collar 17 is in its fully closed position. The end surface 40 of the semi-annular member 18 has a shallow groove 42 formed therein which extends from the uppermost face 20 to the lowermost face 24. The groove 42 is adapted to receive a rib 43 which projects from the surface 41 of the free end of the semi-annular member 19. The purpose of the rib 43 and cooperating grooves will be pointed out hereinafter.

Figure 8:
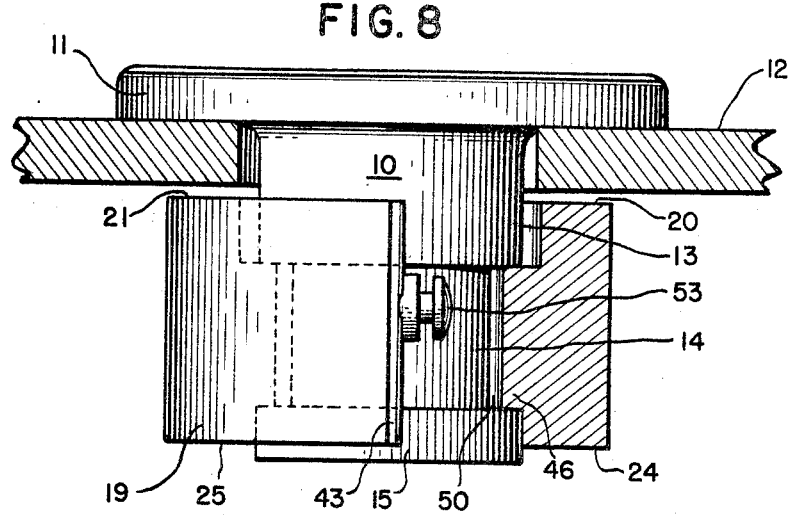
FIGURE 8 is a vertical sectional view showing the lock collar in locked or closed position on the kingpin.

The radius of curvature of the inner surfaces 44 and 45 of the semi-annular members 18, 19, respectively, are substantially the same and are substantially equal to the radius of curvature of the cylindrical section 13 of the kingpin 10. Thus, when the collar 17 is in its closed position the inner surfaces 44 and 45 embrace the outer surface of the kingpin 10. The semi-annular member 18 is provided with an inwardly projecting boss 46 which extends from the inner surface 44. The boss 46 extends arcuately from the end surface 40 to the hinge end and is of sufficient thickness that the inner surface 47 thereof engages the reduced diameter section 14 when the collar 17 is in its closed position on the kingpin 10. It will also be noted that the length of the boss 46, measured in an axial or vertical direction is only slightly shorter than the length of the reduced diameter section 14. The semi-annular member 19 is provided with a boss 48 which is a substantial mirror image of the boss 46. The inner cylindrical surface 49 formed by the arcuate inner surfaces 47 of the bosses 46 and 48 which engages the reduced diameter section 14 when the collar 17 is locked on the kingpin 10 is provided with a plurality of circumferentially spaced, axially extending grooves 50. The grooves 50, in effect form pockets to accommodate the heavy layer of grease which is usually present on the trailer kingpin 10 when the lock collar 17 is placed on the kingpin. From the foregoing, it is apparent that when the lock collar 17 is in its fully opened position, the free end surfaces 40, 41 of the semi-annular members 18, 19, respectively, are separated from each other a distance considerably greater than the diameter of the cylindrical section 13 of the kingpin 10. The lock collar 17 when in this condition, can be readily positioned on the kingpin 10 and the semi-annular members 18, 19 pivoted with respect to each other to their closed condition. When in this closed condition on the kingpin 10, the free end surfaces 40, 41 of the semi-annular members 18, 19, respectively, are in abutting engagement with each other and the inner surfaces 47 of the bosses 46 engage the reduced diameter section 14. It will also be noted that the inner semi-circular surfaces 44 and 45 of the members 18, 19, respectively engage the cylindrical section 13 and the flange 15. From the foregoing, it will be appreciated that when the lock collar 17 is positioned on the kingpin 10 and is in its closed condition, vertical relative movement between it and the kingpin 10 cannot occur. Furthermore, inasmuch as the reduced diameter section 44 of the kingpin 10 is completely covered or bridged and since the outer diameter of the lock collar 17 far exceeds the width of the elongated slot formed in the tractor fifth wheel plate for receiving trailer kingpins, the kingpin 10, when the lock collar 17 is positioned thereon, cannot enter the tractor fifth wheel plate slot and, thus, the kingpin 10 cannot be engaged with or coupled to a motor truck tractor. It will also be noted that the axial distance between the arcuate surfaces 51, defining the normally lowermost edges of the bosses 46, and the bottom faces 24, 25 is smaller than the axial length of the kingpin flange 15. Consequently, with the lock collar 17 in its closed condition on the kingpin 10 a lowermost portion of the kingpin 10 protrudes from the bottom thereof, as shown in FIGURE 8. The purpose of dimensioning the lock collar 17 with respect to the kingpin 10 in such a manner will be pointed out hereinafter.

Figure 9:
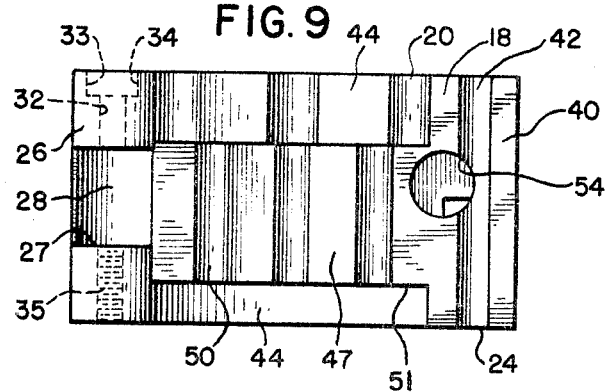
FIGURE 9 is a side elevational view of one of the semi-annular members.

The present invention contemplates the provision of means for releasably locking the collar 17 in its closed condition whereby the collar 17 when in its closed condition on the kingpin 10 is secure against unauthorized removal. The releasable locking means generally includes a key-actuated lock unit 52, which may be of conventional form such as a tumbler type, a latch bolt 53, a latch bolt-receiving socket 54, and a lock element 55. As best shown in FIGURE 9, the latch bolt-receiving socket 54 is generally cylindrical in shape and has one end opening into the end surface 40 of the semi-annular member 18. As evidenced by viewing FIGURE 6, the longitudinal axis of the socket 54 is spaced intermediate the groove 42 and the inner surface 47 of the boss 46 and is oriented substantially perpendicular to the surface 40. It will also be noted that the socket 54 has a diameter of such a size that the longitudinal axis of the groove 42 is tangent to the socket 54. The semi-annular member 19 is provided with a threaded recess 56 which has its longitudinal axis in alignment with the longitudinal axis of the socket 54 when the end surface 40 and 41 are in abutting engagement. One end of the threaded recess 56 is closed and the other end opens into one end of a counterbore 57. The juncture of the counterbore 57 and the threaded recess 56 is defined by an annular shoulder 58. The latch bolt 53, which is generally cylindrical in shape, has one end provided with a reduced diameter, integrally formed threaded section 59 which is adapted to be screwed into the threaded recess 56 until the annular shoulder 60 at the juncture of the threaded section 59 and the main body of the latch bolt 53 firmly abuts or is seated upon the annular shoulder 58. While the means described are preferable for securing the latch bolt 53 to the semi-cylindrical member 19, other means could be employed without departing from the spirit and scope of the invention. That portion of the latch bolt 53 which projects beyond the end surface 41 is provided with a circumferentially extending groove 61. When the semi-annular member 18 and 19 are in their closed condition, the free end of the latch bolt 53 is disposed closely adjacent to the bottom of the socket 54 and the groove 61 is also disposed within the socket 54, as best shown in FIGURE 6.

Figure 6:
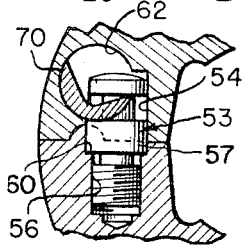
FIGURE 6 is a sectional view taken substantially along line 6—6 of FIGURE 5.
Figures 5, 7:
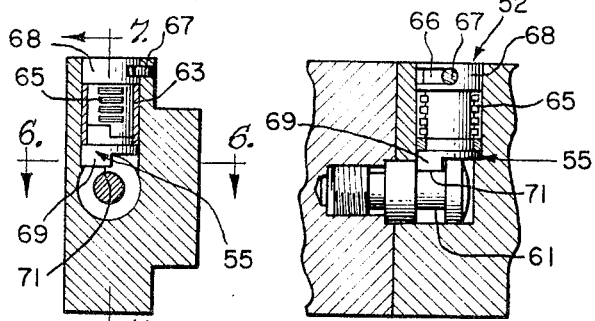
FIGURE 5 is a vertical sectional view taken substantially along line 5—5 of FIGURE 3.
FIGURE 7 is a sectional view taken substantially along line 7—7 of FIGURE 5.

Referring specifically to FIGURES 5, 6, and 7, the semi-annular member 18 is provided with a cylindrical recess 62 which has one end opening in the normally lowermost face 24 and its opposite in communication with the innermost end of the socket 54. The longitudinal axes of the socket 54 and recess 62 are angularly oriented 90° with respect to each other and lie in vertical planes spaced with respect to each other. Thus, when the latch bolt 53 is in its position corresponding to the closed condition of the lock collar 17, a portion thereof is disposed within the recess 62. The significance of this fact will be pointed out presently. The recess 62 serves as a pocket for housing the key-actuated lock unit 52 and the lock element 55. The barrel 63 of the key-actuated lock unit 52, which is preferably of a conventional tumbler type, is pressed into or is rigidly secured within the recess 62 by other suitable means. A reduced diameter section 64 of the lock element 55 extends into the innermost end of the barrel 63 and is operatively connected to the tumbler 65 of the lock unit 52. Inasmuch as the tumbler 65 must be capable of rotating a limited amount with respect to the fixed barrel 63 and yet be prevented from moving axially, a groove 66 and cooperable pin 67 are provided. As best shown in FIGURES 5 and 7, the tumbler 65 of the lock unit 52 is provided with an arcuate groove 66 in a collar 68 disposed adjacent the face 24. The pin or set screw 68 is countersunk below the inner surface 44 and the remaining shallow recess is suitably filled and sealed so as to be unnoticeable. Thus, it will be appreciated that the tumbler 65 of the lock unit 52 is capable of rotating with respect to the barrel 63 an amount equal to the angular extent of the groove 66 which is approximately 90°. The innermost end of the rotatable lock element 55 is in the form of a segmental or crescent-shaped lug 69. The lug 69 has an outer arcuate surface 70 which engages the recess 62 for relative sliding movement. The innermost end surface 71 of the lug 69 is slidably supported upon the surface defining the bottom of the recess 62. From the foregoing, it will be appreciated that turning of the lock tumbler 65 in one direction will cause an end of the lug 69 to enter the socket 54 and the groove 61 if the latch bolt 53 is disposed within the socket 54 and turning of the tumbler 65 in the opposite direction will rotate the lug 69 out of the socket 54. It will also be appreciated that when the semi-annular members 18 and 19 are in their closed positions with the latch bolt 53 disposed within the socket 54, rotation of the lock element 55 by turning of the key 72 in a locking direction causes the lug 72 to enter the groove 61 and engage the surface of the terminal tip portion of the latch bolt 53 partially defining the groove 61. Thus, the latch bolt 53 cannot be withdrawn from the socket 54 and, consequently, the semi-annular members 18 and 19 of the lock collar 17 cannot be separated or opened.

Figure 4:
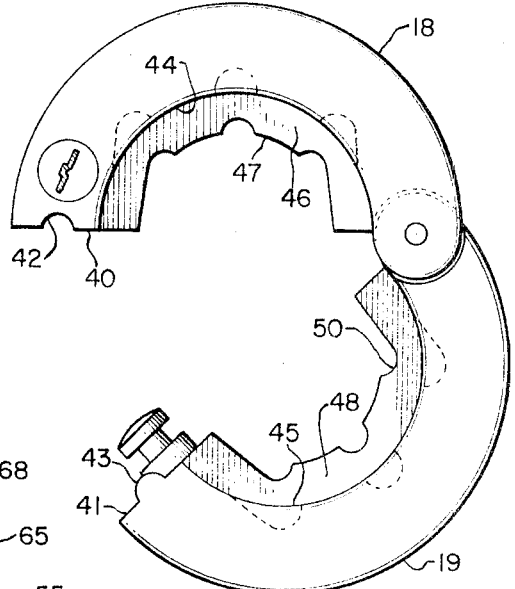
FIGURE 4 is a view similar to FIGURE 3 with the exception that the lock collar is shown in its fully opened or unlocked condition.

From the foregoing description, it is believed the operation of the anti-theft device 16 is obvious and clear. When the lock collar 17 is locked in position on the kingpin 10, the reduced diameter section 14 thereof is covered or bridged and it is impossible for a tractor carried fifth wheel plate to engage the kingpin 10 as the dimensions of the lock collar 17 are such that it will not enter the usual fifth wheel plate slot. In use, the semi-annular members 18 and 19 are unlocked and swung to their fully opened positions as illustrated in FIGURE 4. The fully opened lock collar 17 is then positioned on the kingpin 10 and the semi-annular members 18 and 19 are swung to their closed positions. The key 72 is then rotated in the proper direction to effect locking engagement of the lock element 55 with the latch bolt 53. Thereafter the key 72 is removed from the lock unit 52. To unlock and remove the anti-theft device 16 from the kingpin 10, the above procedure steps are reversed.

Figure 10:
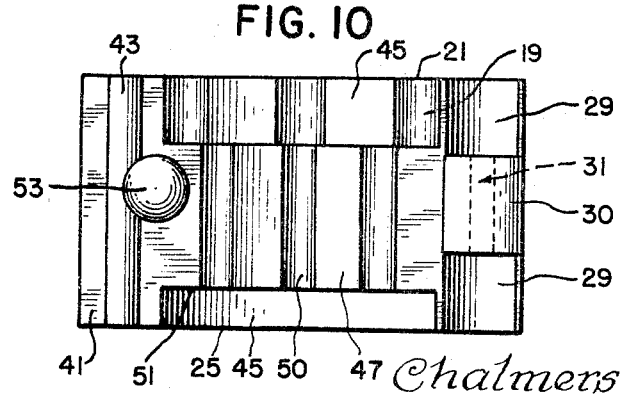
FIGURE 10 is a side elevational view of the other semi-annular member.

It will be noted that when the lock collar 17 is locked on the kingpin 10, the normally uppermost surface 22 thereof is vertically spaced a distance considerably less than the length of the pivot pin 38 from the bottom of the plate 12, and since the pin 38 can only be removed from such uppermost surface 22 to disconnect the hinge ends of the members 18, 19, the hinge ends of the semi-annular members 18, 19 cannot be disconnected when the anti-theft device 16 is locked on the kingpin 10 because of insufficient clearance between the bottom of the trailer-carried plate 12 and the uppermost surface 22 to permit unthreading and removal of the pivot pin 38. The hinge construction affords a simple and inexpensive manner for pivotally connecting the members 18, 19 together but which is sturdy and tamperproof when the lock collar 17 is locked on the kingpin 10. It will also be appreciated that even though the pivot pin 38 should be removed, in some manner, the lock collar 17 will continue to be locked on the kingpin 10 because of the fact that the latch bolt 53 extends into the socket 54 and is engaged by the lock element 55 adjacent its terminal tip. Thus, the disconnected hinge ends of the semi-annular members 18, 19 can not be separated even though the pivot pin 38 is no longer in operative engagement therewith. It will also be noted that when the lock collar 17 is locked in position on the kingpin 10, a lowermost end portion of the kingpin 10 protrudes below the lowermost surface 23 of the device 16. Consequently, the anti-theft device 16 is not apt to be damaged if the kingpin 10 should accidently be placed on a support with the lock collar 17 in locking position on the kingpin 10 since the weight of the trailer would not be transferred to the support through the lock collar 17 but rather directly from the kingpin 10. Referring to FIGURES 9 and 10, it will also be appreciated that since the latch bolt 53 is generally spaced radially inwardly of the rib 43 with a portion of the rib 43 on the surface 41 radially between the latch bolt 53 and the outermost surface of the semi-annular member 19, it would be virtually impossible to break or cut the latch bolt 53 with a chisel or the like because the thief would first have to cut or break through the rib 43.

From the foregoing, it will be seen that the lock collar 17 is compact and relatively light in weight to thereby make it convenient and easy to use but which is constructed of a small number of components which coact with each other in such a manner so as to render the lock collar 17 sturdy and rugged and substantially tamper-proof. The embodiment of the invention chosen for the purposes of description and illustration herein is that preferred for achieving the object of the invention and developing the utility thereof in the most desirable manner, due regard being had to existing factors of economy, simplicity of design and construction, production methods, and the improvements sought to be effected. It will be appreciated, therefore, that the particular structural and functional aspects emphasized herein are not intended to exclude, but rather to suggest such other adaptations and modifications of the invention as fall within the spirit and scope of the invention as defined by the appended claims.

What is claimed is:

1. An anti-theft lock collar for a generally cylindrical, vertically disposed trailer kingpin of the type having a reduced diameter section intermediate its ends, comprising, a pair of substantially semi-annular members; means pivotally connecting one end of each member to the other member whereby said members are movable between a fully opened condition wherein the surfaces defining the free ends of said members are separated a distance greater than the diameter of the kingpin and a closed condition wherein said free end surfaces abut each other, said free end surfaces being relatively flat and lying in a plane containing the pivotal axis of said members when in their closed condition, said members being positionable on a kingpin and movable to said closed condition to encircle and engage the kingpin and cover and operatively engage the reduced diameter section, the pivotal axis of said members being generally vertically disposed when said members are positioned on the kingpin in said closed condition, the free end surfaces of one of said members having an elongated groove formed therein and the free end surface of the other of said members having an integrally formed rib projecting therefrom, said rib being receivable in said groove when said members are in their closed condition, the longitudinal axes of said rib and groove being substantially parallel to the pivotal axis of said members; and releasable lock means for securing said members in their closed condition.

2. An anti-theft lock collar as set forth in claim 1, wherein said releasable lock means includes a generally cylindrical socket formed in one of said members and opening into the free end surface thereof, the longitudinal axis of said socket being substantially perpendicular to said free end surface, a latch bolt rigidly fixed to the other of said members and projecting from the free end surface thereof, said latch bolt being disposed within said socket when said members are in their closed condition, the longitudinal axes of said socket and latch bolt being spaced intermediate the pivotal axis of said members and the longitudinal axes of said rib when said members are in their closed condition whereby a portion of said rib is disposed radially outwardly from said latch bolt; and a key-actuated lock unit carried by said member having said socket formed therein for releasably securing said latch bolt in said socket.

3. An anti-theft lock collar for a generally cylindrical, vertically disposed trailer kingpin of the type having a reduced diameter section intermediate its ends, comprising, a pair of substantially semi-annular members, each of said members having a semi-annular boss projecting from the inner surface thereof; means pivotally connecting one end of each member to the other member whereby said members are movable between a fully opened condition wherein the surfaces defining the free ends of said members are separated a distance greater than the diameter of the kingpin and a closed condition wherein said free end surfaces abut each other, said members being positionable on a kingpin and movable to said closed condition to encircle and engage the kingpin and cover the reduced diameter section and the innermost surfaces of said bosses engaging the reduced diameter section, said innermost surfaces being provided with a plurality of spaced, elongated grooves therein, the longitudinal axes of said grooves being parallel with respect to each other and the pivotal axis of said members; and releasable lock means for securing said members in their closed condition.

4. An anti-theft lock collar for a generally cylindrical, vertically disposed trailer kingpin of the type having a reduced diameter section intermediate its ends, comprising, a pair of substantially semi-annular members, each of said members having a semi-annular boss projecting from the inner surface thereof; means pivotally connecting one end of each member to the other member whereby said members are movable between a fully opened condition wherein the surfaces defining the free ends of said members are separated a distance greater than the diameter of the kingpin and a closed condition wherein said free end surfaces abut each other, said free end surfaces being relatively flat and lying in a plane containing the pivotal axis of said members when in their closed condition, said members being positionable on a kingpin and movable to said closed condition to encircle and engage the kingpin and cover the reduced diameter section with said bosses engaging the reduced diameter section, the pivotal axis of said members being generally vertically disposed when said members are positioned on the kingpin in said closed condition, the free end surface of one of said members having an elongated groove formed therein and the free end surface of the other of said members having an integrally formed rib projecting therefrom, said rib being receivable in said groove when said members are in their closed condition, the longitudinal axes of said rib and groove being substantially parallel to the pivotal axis of said members; and releasable lock means for securing said members in their closed condition.

5. An anti-theft lock collar as set forth in claim 4, wherein said releasable lock means includes a generally cylindrical socket formed in one of said members and opening into the free end surface thereof, the longitudinal axis of said socket being substantially perpendicular to said free end surface, a latch bolt rigidly fixed to the other of said members and projecting substantially perpendicular from the free end surface thereof, said latch bolt being disposed within said socket when said members are in their closed condition, the longitudinal axes of said socket and latch bolt being spaced intermediate the pivotal axis of said members and the longitudinal axis of said rib when said members are in their closed condition whereby a portion of said rib is disposed radially outwardly from said latch bolt; and a key-actuated lock unit carried by said one of said members having said socket formed therein for releasably securing said latch bolt in said socket.

6. An anti-theft lock collar for a generally cylindrical, vertically disposed trailer kingpin of the type having a reduced diameter section intermediate its ends, comprising, a pair of substantially semi-annular members each member having an arcuate, normally horizontally disposed top face and an arcuate bottom face spaced and parallel with respect thereto, each of said members having a semi-annular boss projecting from the inner surface thereof of an axial length substantially equal to the axial length of the kingpin reduced diameter section, the uppermost edge of each of said bosses being vertically spaced below the top surface of a respective member and the lowermost edge of each of said bosses being vertically spaced above the bottom surface of a respective member; means pivotally connecting one end of each member to the other member whereby said members are movable between a fully opened condition wherein the surfaces defining the free ends of said members are separated a distance greater than the diameter of the kingpin and a closed condition wherein said free end surfaces abut each other, said free end surfaces being relatively flat and lying in a plane containing the pivotal axis of said members when in their closed condition, said members being positionable on a kingpin and movable to said closed condition to encircle and engage the kingpin and cover the reduced diameter section and the innermost surfaces of said bosses engage the reduced diameter section, the pivotal axis of said members being generally vertically disposed when said members are positioned on the kingpin in said closed condition, the axial spacing between the bottom face of each of said members and the lowermost edges of its respective boss being less than the axial distance between the reduced diameter section and the lowermost end surface of the kingpin whereby a lowermost end portion of the kingpin extends below said bottom faces when said members are positioned on the kingpin and are in their closed condition, the free end surface of one of said members having an elongated groove formed therein and the free end surface of the other of said members having an integrally formed rib projecting therefrom, said rib being receivable in said groove when said members are in their closed condition, the longitudinal axes of said rib and groove being substantially parallel to the pivotal axis of said members; and releasable lock means for securing said members in their closed condition.

7. An anti-theft lock collar as set forth in claim 6, wherein the innermost surfaces of said bosses engaging the reduced diameter section when said members are positioned on the kingpin and are in their closed condition are provided with a plurality of spaced, elongated grooves therein, the lognituidinal axes of said grooves being parallel with respect to each other and the pivotal axis of said members.

8. An anti-theft lock collar for a generally cylindrical, trailer kingpin of the type having a reduced diameter section intermediate its ends, said trailer pin depending generally vertically from a trailer surface, comprising, a pair of substantially semi-annular members, each of said members having an arcuate, normally horizontally disposed top face and an arcuate bottom face spaced and parallel with respect thereto, one end of said members having a slot formed therein substantially midway between its top and bottom faces and an end of the other of said members having a tongue receivable in said slot, said slot having an elongated bearing extending therethrough said bearing being alignable with an aligned threaded recess and bore formed in said one end of said one of said members, said threaded recess extending from the bottom face of said one of said members to said slot and said bore extending from said slot to one end of a counterbore, said counterbore being formed in said one end of said one of said members, said counterbore opening into the top face of said one of said members; means pivotally connecting one end of each member to the other member whereby said members are movable between a fully opened condition wherein the surfaces defining the free ends of said members are separated a distance greater than the diameter of the kingpin and a closed condition wherein said free end surfaces abut each other, including an elongated pivot pin having one end provided with a threaded section and its opposite end provided with an enlarged head, said threaded section being insertable through said counterbore, bore, bearing, and into engagement with said threaded recess hingedly connecting said members together, said enlarged head being disposed within said counterbore when said members are hingedly connected together, said members being positionable on a kingpin and movable to said closed condition to encircle and engage the kingpin and cover operatively engage the reduced diameter section, the vertical spacing between said top faces of said members and said trailer surface being less than one-half the length of said pivot pin whereby said pivot pin cannot be withdrawn from engagement with said members when said members are positioned on the kingpin and are in their closed condition; and releasable lock means for securing said members in their closed condition.

9. An anti-theft lock collar as set forth in claim 8, wherein said releasable lock means includes a generally cylindrical socket formed in one of said members and opening into the free end surface thereof, a latch bolt rigidly fixed to the other of said members and projecting from the free end surface thereof, said latch bolt being disposed within said socket when said members are in their closed condition, and a key-actuated lock unit carried by said member having said socket formed therein and operable to releasably secure said latch bolt in said socket.

10. An anti-theft lock collar as set forth in claim 9, wherein said member having said socket formed therein has a bore formed therein having one end opening into the bottom face and its opposite end in communication with the innermost end of said socket, said key actuated lock unit being supported within said bore and being accessible for actuation from the bottom face of said member having said socket formed therein.

11. An anti-theft lock collar as set forth in claim 10, wherein said latch bolt has a circumferential groove adjacent its terminal end, and said releasable lock means further includes a lock element, said lock element having a lug formed on one end thereof, said lock element being supported in the bottom of said bore for relative rotation between an unlocked position wherein said lug is completely without said socket and a locked position wherein said lug extends into said socket, said lug extending into said latch bolt groove when said lock element is in its locked position and said members are in their closed condition to prevent withdrawal of said latch bolt from said socket, and said lock unit including a lock tumbler having one end connected to said lock element for rotating the same.

References Cited by the Examiner
UNITED STATES PATENTS

| | | | |
|---|---|---|---|
| 2,656,706 | 10/1953 | Lucas et al. | 70—232 |
| 2,785,564 | 3/1957 | Rossi | 70—232 |
| 3,004,421 | 10/1961 | Bowler | 70—232 |
| 3,112,636 | 12/1963 | McIntyre | 70—232 |

BOBBY R. GAY, *Primary Examiner.*